United States Patent
Jain et al.

(10) Patent No.: US 10,474,396 B2
(45) Date of Patent: Nov. 12, 2019

(54) SYSTEM AND METHOD FOR MANAGING MULTIPLE FILE SYSTEMS IN A MEMORY

(71) Applicant: SanDisk Technologies LLC, Plano, TX (US)

(72) Inventors: Vimal Kumar Jain, Bangalore (IN); Balasiva Kumar Narala, Kakinada (IN); Aditya Pratap Sharma, Bangalore (IN); Judah Gamliel Hahn, Ofra (IL)

(73) Assignee: SanDisk Technologies LLC, Plano, TX (US)

( * ) Notice: Subject to any disclaimer, the term of this patent is extended or adjusted under 35 U.S.C. 154(b) by 317 days.

(21) Appl. No.: 15/427,706

(22) Filed: Feb. 8, 2017

(65) Prior Publication Data
US 2018/0113875 A1 Apr. 26, 2018

(30) Foreign Application Priority Data
Oct. 25, 2016 (IN) .............................. 201641036493

(51) Int. Cl.
*G06F 17/30* (2006.01)
*G06F 3/06* (2006.01)
*G06F 16/18* (2019.01)

(52) U.S. Cl.
CPC .......... *G06F 3/0679* (2013.01); *G06F 3/0623* (2013.01); *G06F 3/0643* (2013.01); *G06F 3/0644* (2013.01); *G06F 3/0688* (2013.01); *G06F 16/1847* (2019.01)

(58) Field of Classification Search
CPC ....................................................... G06F 17/30
USPC .......................................................... 707/822
See application file for complete search history.

(56) References Cited

U.S. PATENT DOCUMENTS

| | | | | |
|---|---|---|---|---|
| 5,495,607 | A * | 2/1996 | Pisello | G06F 16/168 707/797 |
| 5,737,523 | A * | 4/1998 | Callaghan | G06F 21/6236 709/225 |
| 6,014,659 | A * | 1/2000 | Wilkinson, III | H04L 45/54 707/769 |
| 6,757,695 | B1 | 6/2004 | Noveck et al. | |
| 7,933,033 | B2 * | 4/2011 | Ohishi | H04N 1/00204 358/1.15 |
| 8,099,569 | B2 * | 1/2012 | Sugiura | G06F 3/0605 711/161 |
| 8,868,622 | B2 * | 10/2014 | Chellam | G06F 9/5077 707/802 |
| 8,886,597 | B2 | 11/2014 | Hahn et al. | |

(Continued)

*Primary Examiner* — Kim T Nguyen
(74) *Attorney, Agent, or Firm* — Brinks Gilson & Lione

(57) ABSTRACT

A system and method for managing multiple file systems on a single non-volatile memory system is described. The system may include a non-volatile memory system with non-volatile memory having first and second file systems, each associated with respective files, and having a common pool of free space. The controller may be configured to update a file system to be mounted to reflect a capacity relating to only the respective files for that file system and all of the common pool of free space, while hiding from the host the file system not being mounted. The method may include the controller only presenting a single file system and hiding the unmounted file system, or may include the controller managing multiple file systems by presenting multiple file systems concurrently.

20 Claims, 16 Drawing Sheets

(56) References Cited

U.S. PATENT DOCUMENTS 9,519,545 B2 * 12/2016 Niewczas ........... G06F 11/1441
2001/0018717 A1 8/2001 Shimotono

* cited by examiner

Secure FAT Table

Regular/Non-Secure FAT Table

| RE1 | RE2 | RE3 | RE4 | RE5 |
| RE6 | RE7 | | | |

FIG. 17A

Secure FAT Table

| SE1 | SE2 | SE3 | SE4 | |

Regular/Non-Secure FAT Table

| RE1 | RE2 | RE3 | RE4 | RE5 |
| RE6 | RE7 | SE1 | SE2 | RE8 |
| SE3 | SE4 | | | |

SYSTEM AND METHOD FOR MANAGING MULTIPLE FILE SYSTEMS IN A MEMORY

CROSS-REFERENCE TO RELATED APPLICATIONS

This application claims, under 35 U.S.C. § 119(a), the benefit of Indian Application No. 201641036493, filed on Oct. 25, 2016, which is hereby incorporated by reference herein in its entirety.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Flash memory is often made up of groups of memory cells referred to as pages, and multiple pages are often then organized in groups known as blocks. Flash memory cells may be physically configured to store data in different bit per cell densities.

Data security is often a high priority to users of memory systems. The ability to provide secure files or secure partitions in a non-volatile memory is an advantage, but there may still be data preservation and access issues, for example the susceptibility of secure data in a file or partition to erasure via formatting of a file system by someone who does not have access rights to the secure data.

BRIEF DESCRIPTION OF THE DRAWINGS

FIGS. 17A-17D illustrate example secure and non-secure FAT tables for a hypothetical multi file system non-volatile memory system during file system creation, write operations, file system deletion and file erase states.

DETAILED DESCRIPTION

Figure 1A:
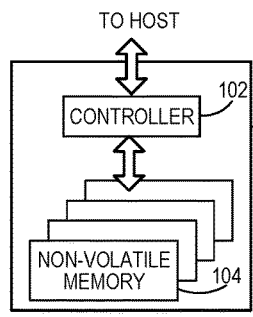
FIG. 1A is a block diagram of an example non-volatile memory system.

In order to manage open (unsecure) and secure data effectively, a method and system for managing multiple file systems is disclosed, where each different file system may have different access restrictions and, in some instances, may prevent unintended erasure of secure data due to resetting or formatting generally of a single file system memory system.

According to a first aspect, a non-volatile memory system for communication with a host is disclosed. The non-volatile memory system may include a non-volatile memory having a maximum storage capacity and containing a first file system associated with data occupying a first portion of the maximum storage capacity, a second file system associated with data occupying a second portion of the maximum storage capacity, the first portion being different than the second portion, and a free space portion made up of available capacity remaining in the non-volatile memory other than the first portion and the second portion. The non-volatile memory system may also include a controller in communication with the non-volatile memory. The controller is configured to, responsive to receipt of a file system mounting trigger for mounting the second file system, determine a current capacity associated with the free space portion and to unmount the first file system. The controller is further configured to mount the second file system, wherein to mount the second file system the controller is further configured to, independently of the host, update the second file system to present a total capacity of the second file system to the host as equal to a sum of the current capacity of the free space portion and an amount of the maximum storage capacity currently occupied by data associated with the second file system while hiding the first file system from the host.

In another aspect, a method for managing multiple file systems on a non-volatile memory system is disclosed. The non-volatile memory system may have non-volatile memory, a plurality of file systems each associated with a respective portion of the non-volatile memory and a controller in communication with the non-volatile memory. According to the method, the controller of the non-volatile memory receives a file system mounting trigger, selects one of the plurality of file systems based on the mounting trigger and determines a current amount of free space in the non-volatile memory. The method further includes the controller adjusting a size of a logical address range of the selected one of the plurality of file systems to include logical addresses for the current amount of free space in the non-volatile memory and logical addresses already associated with data managed by the selected one of the plurality of file systems, and then presenting to a host the selected one of the plurality of file systems as having the adjusted size of the logical address range.

In another aspect, a method is disclosed for managing both a first file system and a second file system on a non-volatile memory system, where the non-volatile memory system includes non-volatile memory, each of the first and second file systems associated with respective files occupying a respective portion of the non-volatile memory, and a controller is in communication with the non-volatile memory. The method includes the controller of the non-volatile memory system allocating a first portion of free space available in the non-volatile memory to the first file system and allocating a second portion of free space available in the non-volatile memory to the second file system. The method further includes the controller updating the first file system to identify the second file system as a single file occupying an amount of physical capacity of the non-volatile memory system equal to a capacity of the respective files associated with the second file system and the second portion of free space available in the non-volatile memory.

FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A non-volatile memory system 100 includes a single channel between controller 102 and non-volatile memory die 104, the subject matter described herein is not limited to having a single memory channel. For example, in some NAND memory system architectures, such as in FIGS. 1B and 1C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
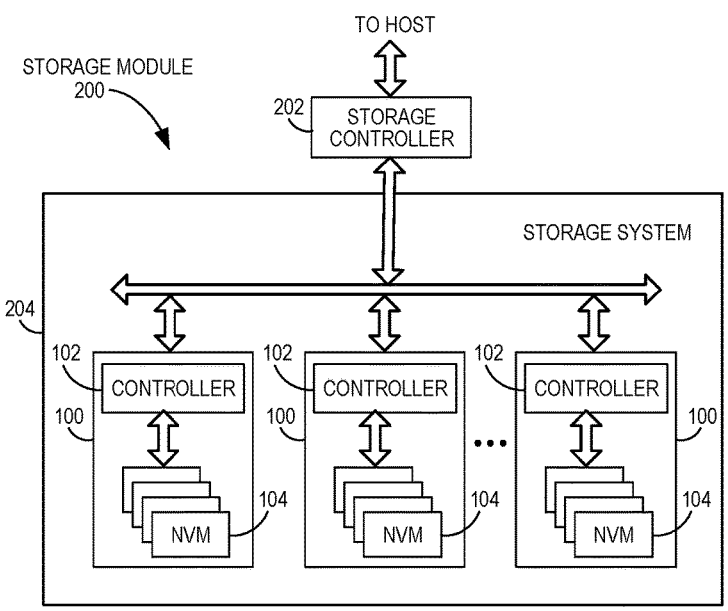
FIG. 1B is a block diagram illustrating an exemplary storage module.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100. The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
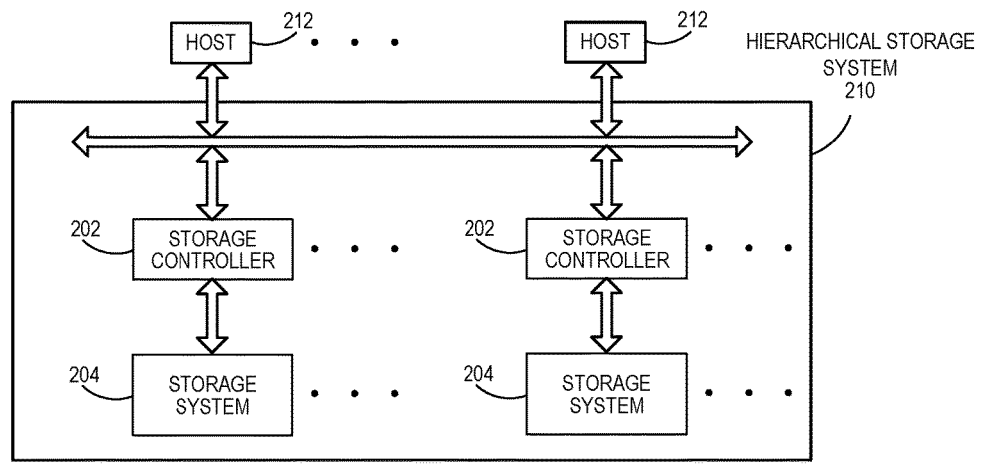
FIG. 1C is a block diagram illustrating a hierarchical storage system.

FIG. 1C is a block diagram illustrating a hierarchical storage system. A hierarchical storage system 210 includes a plurality of storage controllers 202, each of which controls a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
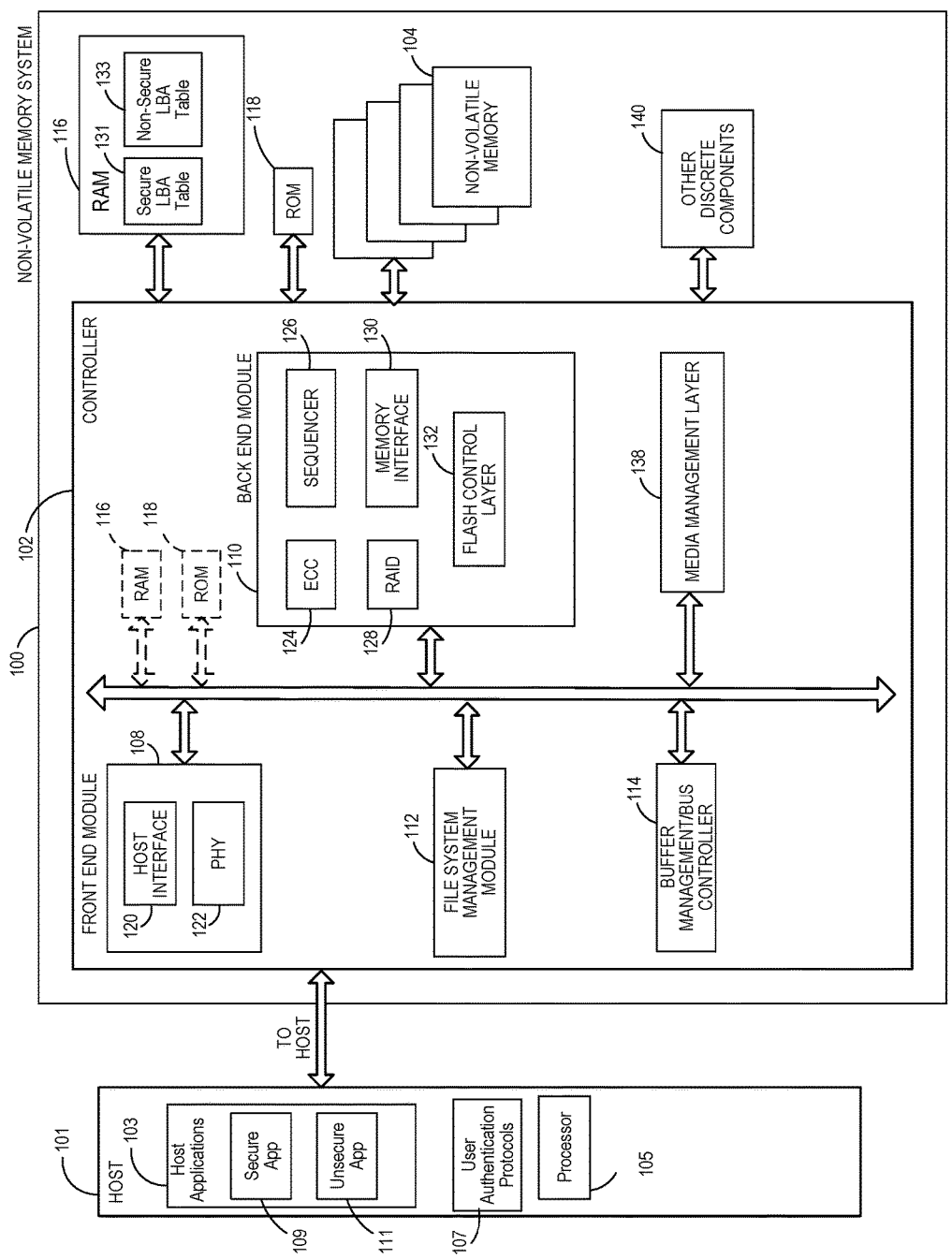
FIG. 2A is a block diagram illustrating exemplary components of a controller of a non-volatile memory system.

FIG. 2A is a block diagram illustrating a host 101 in communication with a NVM system 100. The host 101 may include a processor 105 that operates one or more host applications 103, including secure applications 109 requiring user authentication and non-secure applications 111 that do not require authentication. The host 101 may include user authentication protocols 107 such as IEEE-1667 or other authentication protocols. FIG. 2A also illustrates exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a file system management module 112 present on the die of the controller 102. As explained in more detail below, the file system management module 112 may control the NVM system 100 to, in one implementation, manage separate file systems where one file system is mounted while the other is hidden. As also discussed in greater detail below, the file system management module may alternatively show the presence of different file systems simultaneously, where one is fully accessible only through a secure authentication process. The file system management module 112 may manage files in each of the file systems separately, while sharing unused space in the NVM system for both, or may divide up the free space between the two file systems in implementations when the presence of both file systems is viewable concurrently.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host 101, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
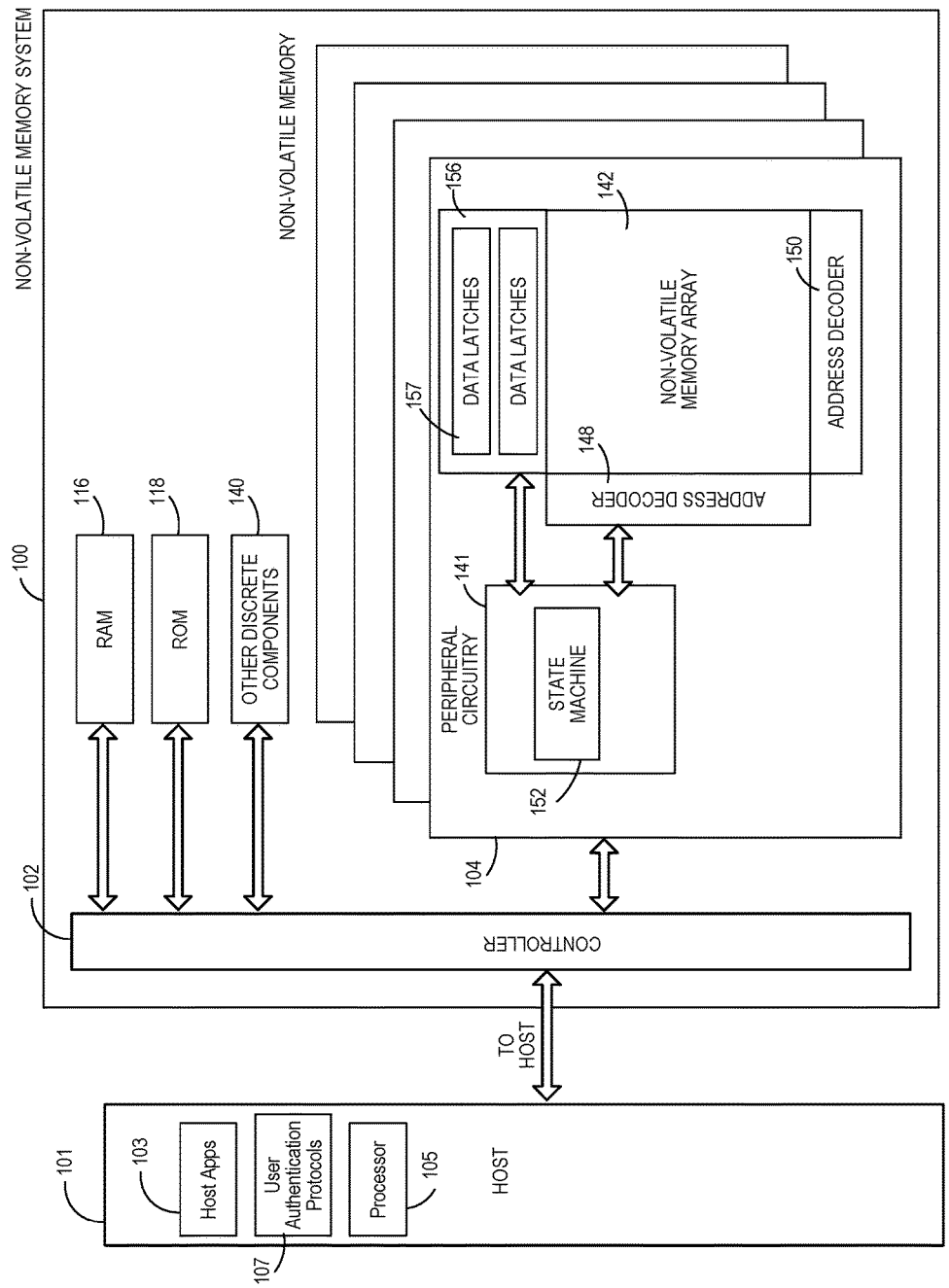
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two-dimensional and/or three-dimensional configuration. Peripheral circuitry 141 includes a state machine 152 that provides status information to controller 102. Non-volatile memory die 104 further includes a data cache 156 that caches data. A host 101 is also illustrated in FIGS. 2A and 2B having one or more host applications 103 and user authentication protocols 107 that operate via the host processor 105 to communicate with the NVM system 100. The host 101 may be any device that is capable of communicating with the non-volatile memory system 100 using standard memory protocol commands.

Figure 3:
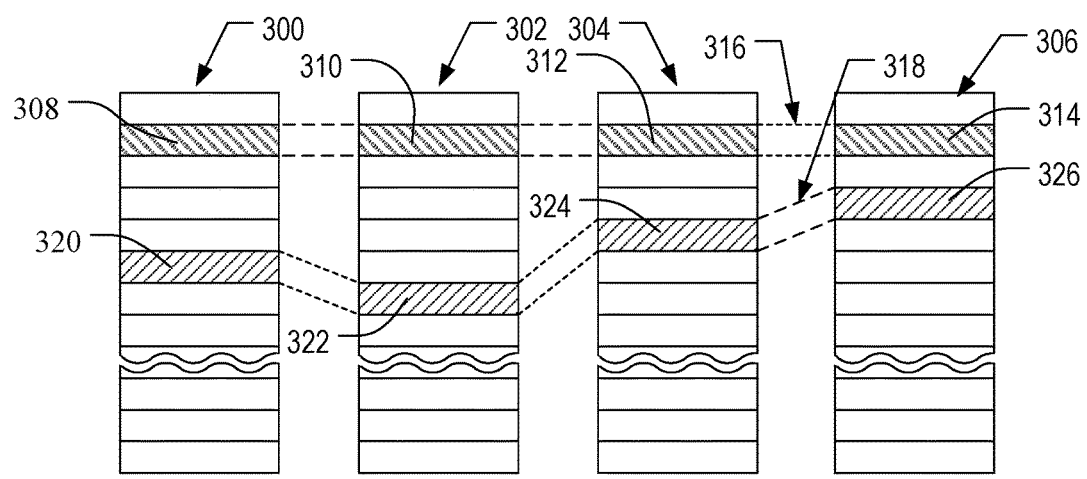
FIG. 3 illustrates an example physical memory organization of the non-volatile memory system of FIG. 1A.

The non-volatile flash memory array 142 in the non-volatile memory 104 may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. Referring to FIG. 3, a conceptual illustration of a representative flash memory cell array is shown. Four planes or sub-arrays 300, 302, 304 and 306 of memory cells may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 3 by rectangles, such as blocks 308, 310, 312 and 314, located in respective planes 300, 302, 304 and 306. There may be dozens or hundreds of blocks in each plane. Blocks may be logically linked together to form a metablock that may be erased as a single unit. For example, blocks 308, 310, 312 and 314 may form a first metablock 316. The blocks used to form a metablock need not be restricted to the same relative locations within their respective planes, as is shown in the second metablock 318 made up of blocks 320, 322, 324 and 326.

Figure 4:
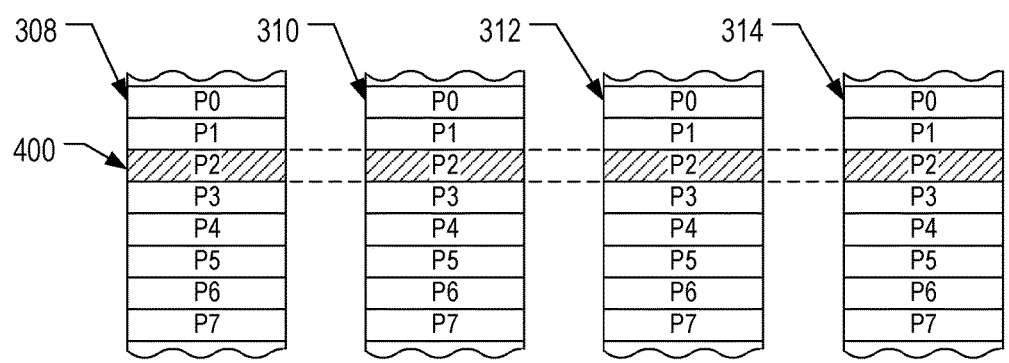
FIG. 4 shows an expanded view of a portion of the physical memory of FIG. 3.

The individual blocks are in turn divided for operational purposes into pages of memory cells, as illustrated in FIG. 4. The memory cells of each of blocks 308, 310, 312 and 314, for example, are each divided into eight pages P0-P7. Alternately, there may be 16, 32 or more pages of memory cells within each block. A page is the unit of data programming within a block, containing the minimum amount of data that are programmed at one time. The minimum unit of data that can be read at one time may be less than a page. A metapage 400 is illustrated in FIG. 4 as formed of one physical page for each of the four blocks 308, 310, 312 and 314. The metapage 400 includes the page P2 in each of the four blocks but the pages of a metapage need not necessarily have the same relative position within each of the blocks. A metapage is typically the maximum unit of programming, although larger groupings may be programmed. The blocks disclosed in FIGS. 3-4 are referred to herein as physical blocks because they relate to groups of physical memory cells as discussed above. As used herein, a logical block is a virtual unit of address space defined to have the same size as a physical block. Each logical block may include a range of logical block addresses (LBAs) that are associated with data received from a host. The LBAs are then mapped to one or more physical blocks in the non-volatile memory system 100 where the data is physically stored.

In an exemplary embodiment discussed herein, an LBA may be mapped to an intermediary virtual block address and the virtual block address in turn may be mapped to a physical block. Data stored in one physical block may be copied to different physical block. After copying the data, virtual block address may be remapped to point to the new physical block. One advantage of performing the remapping using the intermediate virtual block address is that the logical block address associated with the data is not changed. Because the logical block address associated with the data is not changed, the host system may be agnostic to the remapping of the logical block address and the copying of the data from one physical block to a second physical block.

In addition to the user data and host-generated file system tables that may be stored in flash memory on the storage device, the storage device itself stores and maintains a mapping table or other data structure that tracks the logical addresses supplied by the host file system and the physical addresses where the storage device is keeping the data. One way to maintain a primary mapping table of all logical to physical address relationships (a logical to physical mapping table) in the storage device is to maintain the entire table in flash memory (such as NAND flash) and to then copy the entire table into mapping table in RAM 116 in the NVM system 102. In the multiple file system implementations discussed below, different file system metadata for the secure and non-secure file systems sharing the same non-volatile memory system may include FAT tables or other file system components being stored in non-volatile memory and/or RAM 116. Secure LBA table data 131 and non-secure LBA table data 133 may be stored in RAM 116 internal to or external to the controller 102 for fast access.

In one implementation, the mapping table 131,133 for each file system may be a pair of mapping tables, with a logical to virtual mapping table and a virtual to physical mapping table, rather than a single logical-to-physical mapping. In this implementation, one or more entries in the logical-to-virtual mapping table may include a reference to an entry in the virtual-to-physical to mapping table. An entry in the virtual-to-physical mapping table may include a reference to a physical block where the memory controller may store data received from the host system 100.

Figure 5:
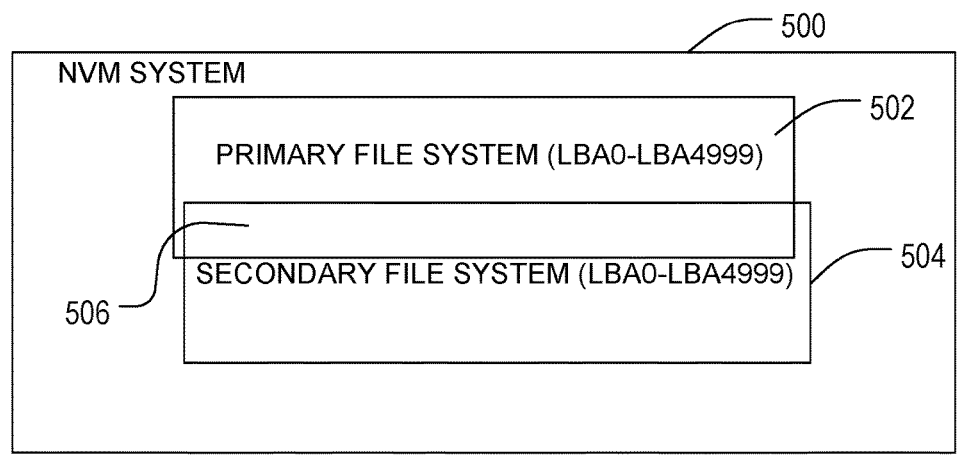
FIG. 5 is a conceptual view of multiple file systems in a non-volatile memory having shared free space.

FIG. 5 is a conceptual block diagram of multiple file system organization in one embodiment of a NVM system 500, which corresponds to the NVM system 100 of FIGS. 2A-2B. The file system organization in the NVM system includes a primary file system 502 and a secondary file system 504, where each of the file systems 502, 504 represents a respective group of linear address space of non-volatile memory. The linear address space may also be referred to herein as a volume, such that there are two separate volumes shown in FIG. 5. Both of the file systems 502, 504 share the same physical space, where LBAs associated with data for the primary file system and secondary file system are each uniquely associated with a respective different physical address and the free space 506 available is shared or allocated to each file system 502, 504 depending on the embodiment noted below. In one implementation the primary file system 502 is visible by default to the host 101, while the secondary file system 504 is hidden until detection of appropriate user action, for example authentication. As discussed below, only one file system may be visible to the host at a given time in some implementations, while in other implementations both file systems may be visible simultaneously (after user action, such as authentication, to gain access to the secondary file system). More than two file systems 502, 504 may be supported in different implementations. The two file system example of FIG. 5 is scalable to multiple additional file systems and the two file system example of FIG. 5 is provided only for ease of illustration.

Figure 6:
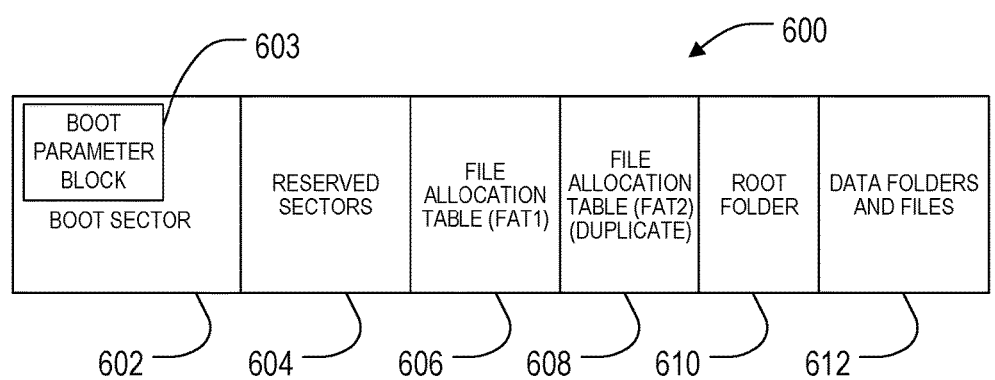
FIG. 6 illustrates an example file system volume for a FAT file system usable in the non-volatile memory system of FIGS. 2A-2B.

Referring to FIG. 6, an example FAT volume 600 is shown. The illustration of a FAT file system structure is simply provided by way of example and other file systems, including NTFS and any of a number of other known file system architectures may be used in alternative implementations. The FAT volume 600 may include a boot sector 602 that contains a boot parameter block, sometimes referred to as a BIOS block, that stores information about the layout of the volume 600 and the file system structures. The FAT volume 600 may also include reserved sectors 604 that precede the start of the file allocation table (FAT) 606. The FAT 606 provides a mapping of files to memory locations and a backup copy FAT 608 (also referred to as FAT2) is maintained as well. A root folder 610 may contain the files and folders in the root, or highest level, of the partition. Finally, the FAT volume 600 includes the data files and folder data 612 for the files and folders within the particular file system. The FAT volume information may be stored in non-volatile memory 104 in the NVM system. In one embodiment, each file system present in the NVM system 100, 500 has its own FAT volume structure such as FAT volume 600. In one implementation, the file systems may be mounted and unmounted by the file system management module 112 swapping the boot sector 602 for the mounted file system with the boot sector for the unmounted file system.

Static File System Resizing—Single Visible File System

In a first implementation of the multiple file system management capabilities of the file system management module 112 in the NVM system 100, the dual file systems 502, 504 are only visible one at a time, and not simultaneously. This form of multiple file system management is also referred to herein as static file system resizing. The static file system resizing technique is static in the sense that the single file system (primary 502 or secondary 504 in this example) that is visible at any given time would stay the same while it is being viewed by the host.

The file system management module 112, in cooperation with the controller 102, may implement the static file system resizing technique by showing the host all of the free space in the NVM system 100 as available to whatever file system is currently mounted. The mounted file system refers to the file system that the host currently recognizes as running the entire NVM system 100 and the other file system is considered unmounted. If the entire NVM system 100 has a capacity of one gigabyte (1 Gbyte) and the primary file system 502 (which may be, for example, an open or unsecure file system) has 250 megabytes of data stored in it and the secondary file system 504 (for example a secure file system) has 250 megabytes of data associated with it, then there are 500 megabytes of free. If the primary file system 502 is mounted then the 250 megabytes of actual data stored in the primary file system 502 is shown, by the file system management module 112, with the 500 megabytes of free space 506 for a total of 750 megabytes of capacity associated with the primary file system 502. The host only sees the primary file system 502, such that it treats the primary file system 502 as a currently mounted memory device and does not know about the secondary file system 504, and the host believes it is attached to a device having a total capacity of 750 megabytes. The primary file system 502 may be a default, non-secure, file system that is automatically mounted by the NVM system 100 upon detection of a power on reset for the device.

Assuming that no data is deleted from or added to the primary file system 502 and it still has 250 megabytes occupied by data, if the host were then to authenticate to the secondary file system 504, the secondary file system 504 would be shown by the controller 102 as having its 250 megabytes of data and the 500 megabytes of free space 506 as its own free space so that the host device with the secure file system mounted would see 750 megabytes of capacity. In order to authenticate to the secure file system, the host and NVM system 100 may each have authentication processing capability, such as IEEE-1667 protocol capability or similar known authentication protocol capability, which allows for standard authentication commands to be sent from the host to the NVM system 100 to access the hidden directories in other secure aspects.

In this static file system resizing implementation, only one file system is mounted and visible to the host at any given time. Because of this, the host does not need to know that the memory device is actually resizing the file systems since the host only sees one file system at a time and does not have any information on that file system. Essentially, changing which file system is mounted may be considered analogous to removing and inserting a separate Universal Serial Bus (USB) drive and the host just looks at whatever file system the "USB drive" presents the host as its file system.

Continuing with this same example of the 1 Gbyte NVM system with single mounted/visible file system and static file system resizing, if additional data is written to the primary file system 502 while it is mounted such that another 100 megabytes of data is stored, then the free space available is only 400 megabytes because 100 of the 500 megabytes have just been used up by the primary file system 502. At this moment, if the secondary file system 504 is remounted, the host will only see 650 megabytes of total capacity instead of the 750 megabytes of total capacity for the secondary file system 504 that it last saw. Neither the existence of, nor any files in, the primary file system 502 will be available or known to the host while the secondary file system 504 is mounted. The reverse is true when the primary file system 502 is mounted.

In the static file system resizing implementation, two items may be changed by the file system management module 112 of the controller 102 when a different file system is mounted in the NVM system 100. First, the controller 102 updates the boot parameter block and the file allocation table (FAT) 606 associated with the file system it is about to mount. Because the primary file system 502 used an additional 100 megabytes for data, it took away 100 Mbytes from the shared free space between the two file systems 502, 504. When the secondary file system 504 is mounted next, the controller changes the boot block 603 in the boot sector 602 to update the available space to 650 megabytes from 750 megabytes and the FAT table data for the secure file system is also resized to have the same logical size as a free space permits. The boot sector 602, typically at logical block address (LBA) 0, is changed to point to the boot block and FAT table for the secondary file system 504. The NVM system 100 may perform some logical space defragmentation to account for non-sequential logical block addresses being taken up or freed by the recent activity in the (now unmounted) primary file system 502. Any of a number of known defragmentation techniques may be used on the non-volatile memory of the NVM system for data within a particular file system.

It is to be noted that there are separate logical to physical mapping tables (for example, FIG. 2A; 131,133) stored in the NVM system 102, one for each of the file systems being managed, in this example one for each of the primary and secondary file systems 502, 504. The logical address space may be numbered in the same manner in both file systems, for example LBA0-LBAX, and the logical-to-physical maps are directed to the same pool of physical addresses, but each logical address is only associated with one unique physical addressing containing data. Synchronization of the two logical-to-physical mapping tables occurs on mounting of a new file system, thus preventing assignment of same physical block to more than one LBA. One benefit of the single visible file system mechanism of the static file system resizing version discussed above is that the host need not have any special application or software other than the ability to indicate to the NVM system, through IEEE-1667 or a similar standard with indication mechanism, that access is desired to a secure file system.

Figure 7:
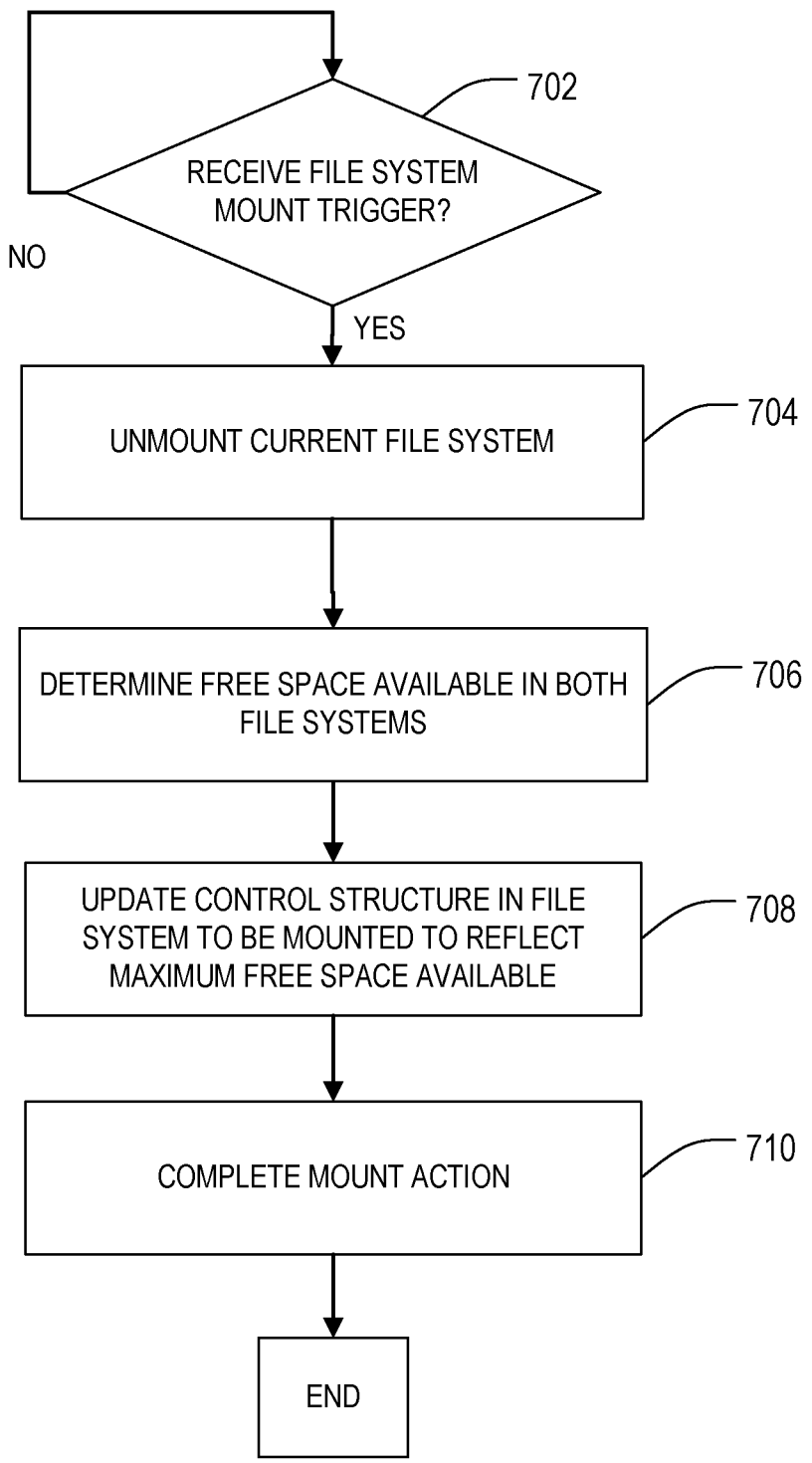
FIG. 7 is a flow chart of an example method of mounting/unmounting different file systems in a single non-volatile memory system using a static file resizing technique.

Referring now to FIG. 7, one embodiment of a method for implementing multiple file systems using the static file system resizing technique described above is shown. When there is an action triggering the mounting of a different file system (at 702), the file system management module causes the current file system to be unmounted (at 704). A mount trigger may be a request from a host to access another file system, for example through a secure application 103 on a host 101 that utilizes authentication protocols 107 such as an IEEE-1667. Unmounting the current file system may consist of the host 101 closing down the file system currently in use and freeing up the operating system to connect with a different file system (e.g. a different FAT volume 600). In one implementation, unmounting of a file system does not cause a change to that file system because while mounted it was kept up to date. Instead, the file system being mounted (e.g. through changing a system pointer from the boot sector of the currently mounted file system to the boot sector 602 of the desired file system) is updated to synchronize and update the logical block tables.

More specifically, the method proceeds with the controller 102 of the NVM system 100 determining the amount of free space available in the different file systems 502, 504 on the NVM system (at 706). The amount of free space may be determined by the controller 102 looking at the number of physical addresses associated with valid data in each file system, for example via the controller 102 analyzing the respective FAT tables 606 in each file system. Once the amount of free space available in the NVM system 500 is determined, the control structures for the file system being mounted (for example, those of the secondary file system 504) are automatically updated by controller 102 of the NVM system 100 so as to reflect the current free space available is now part of the file system being mounted (at 708). The data structures may be the boot block and the FAT for the file system being mounted. The updates to these data structures (also referred to as control structures) may include updating the FAT and the boot parameter block to enlarge or shrink the file system to make the file system's volume bigger or smaller (for example the number of logical block addresses (LBAs) associated with the file system may be changed in the FAT for the file system being mounted. Subsequently, the mount action may be completed by the controller 102 of the NVM system 100, via the file system management module 112, making these updated data structures available to the host 101 for use (at 710). Thus, the static resizing technique discussed above and with reference to FIG. 5 illustrates a method for a NVM system 100, rather than a host, making the changes to the file system being mounted to resize that file system.

Concurrently Viewable File Systems

In contrast to the single file system visibility in the version of the static file system resizing technique discussed above, where the NVM system 100 makes changes to the file system (such as the FAT volume 600 associated with the particular file system) rather than the host, a dual file system visibility version includes active host involvement and necessitates the host having understanding of the capabilities of the storage device. In the single visible file system version of static file system resizing, only one file system need be changed at a time by the NVM system, and that change may only occur at the time a different file system is mounted. Unlike the single static file system technique, a concurrently visible file system version with two file systems may include the feature of the controller 102 increasing one file system and shrinking the other at the same time. The concurrently viewable file systems embodiment discussed below also includes the NVM system 100 informing the host 101 that the NVM system 100 needs the file system changed or the NVM system 100 adjusting the file system data structures without the host 101 making the changes. Multiple variations of a dual visible file system method (again, assuming two file systems for ease of illustration) are contemplated.

Figure 8:
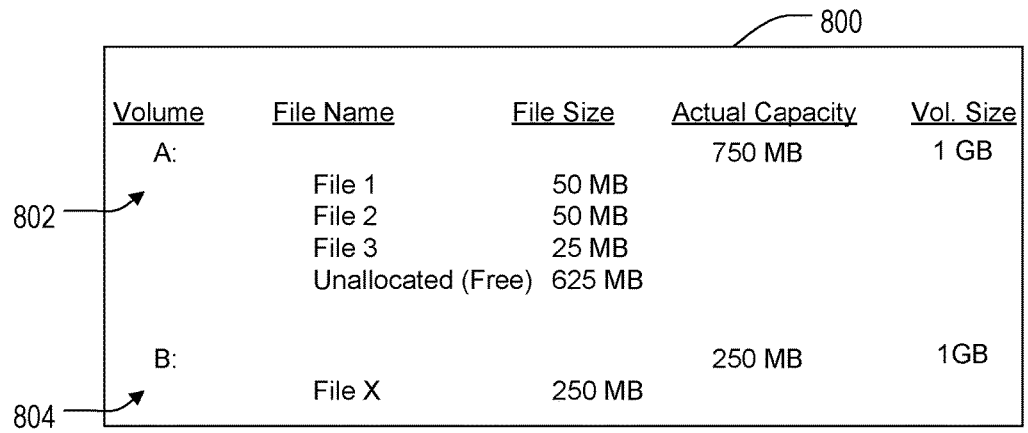
FIG. 8 illustrates an example user interface display showing secure and non-secure file systems concurrently as separate volumes.

A first variation is one where each of the different file systems is shown as a separate drive or volume letter on the host (e.g., A: and B:) with each drive or volume having certain files in it. FIG. 8 illustrates a possible user interface display 800 on a host 101 showing the primary file system as volume A 802 with a total capacity of 750 Megabytes and containing certain files and unallocated free space. The secondary file system is shown as a different volume, volume B 804, having a single file with a size that occupies the rest of the memory of a hypothetical 1 Gbyte NVM system. With respect to this multiple drive/volume letter version, the file system not currently being written to is shown as a single device-managed file (File X). For example, if the secondary file system (here, volume B) is being reviewed and written to, the primary file system (here volume A) may then be shown concurrently to a user as a single file rather than as all the separate files illustrated in FIG. 8 actually in the primary file system.

Figure 9A:
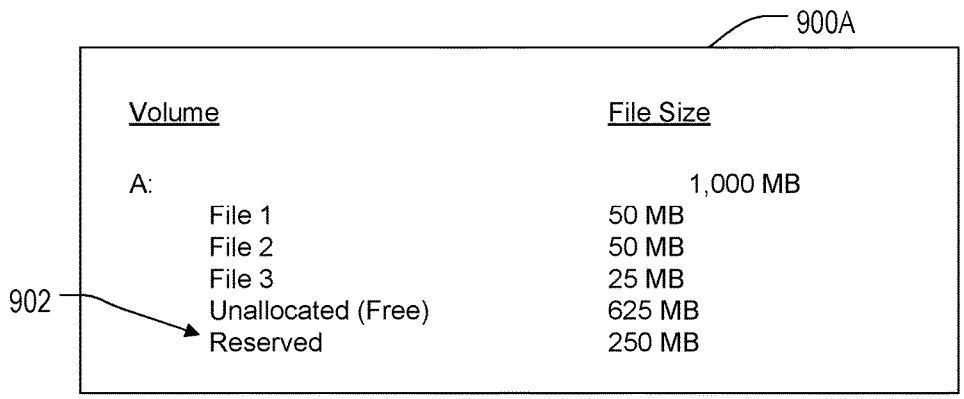
FIG. 9A is an alternative user interface display of FIG. 8 showing an unmounted secure file system as reserved space in the mounted unsecure file system.
Figure 9B:
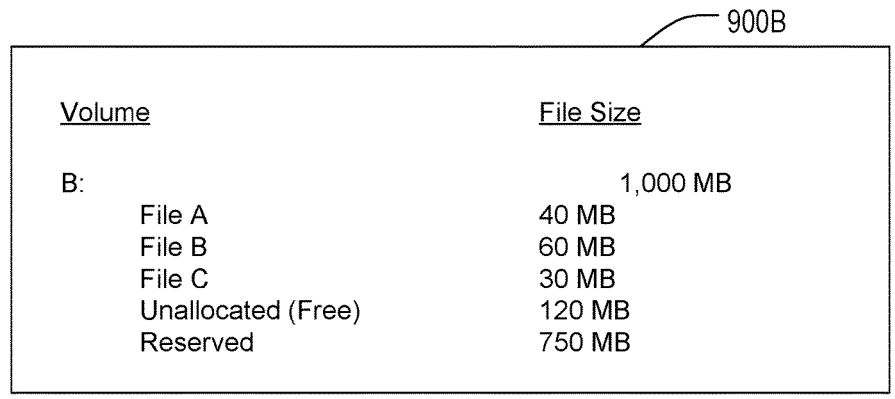
FIG. 9B is an alternative view of the interface display of FIG. 9A where the secure file system is mounted and the unsecure file system is displayed as reserved space in the mounted secure file system.

A second variation of concurrently viewable file systems is one where the controller 102 of the NVM system 100 marks space corresponding to the file system not currently being manipulated (e.g. the file system not currently being written to or read from) as bad sectors or reserved space in a single file in the file system currently being manipulated. Thus, referring to FIG. 9A, a user interface display 900A may show primary file system (volume A:) as having files such as those illustrated in FIG. 8, but with an extra reserved file 902 rather than a separate volume number, where the reserved file 902 represents all of the used or free space currently assigned to the secondary file system. In instances where there are more than two file systems, each file system may appear as a separate reserved file. FIG. 9B illustrates an example of concurrent visibility of file systems on a display 900B when the secondary file system (volume B:) is actively being manipulated and the primary file system is not, such that the primary file system is now presented as a single reserved file of the capacity representing both the written and free space assigned to the primary file system.

Figure 10:
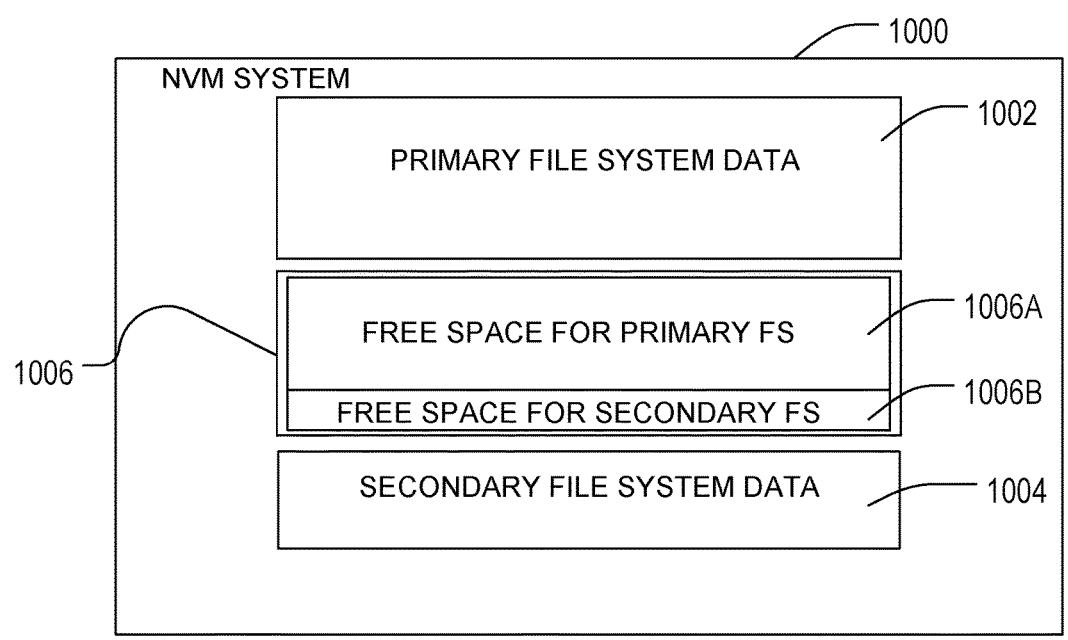
FIG. 10 is a conceptual view of multiple file systems in a non-volatile memory system having free space divided into separate portions for the multiple file systems.

Referring to FIG. 10, in implementations where both file systems are visible at the same time, the NVM system 1000 can't show that it has more capacity than the actual total capacity. In other words, in implementations where multiple file systems are concurrently viewable, the free space in the NVM system is not simply shown as all assigned to any one file system. Instead, the free space needs to be divided up between the two concurrently visible file systems. In the overlapping file systems 502,504 that share free space 506 shown in FIG. 5, only one file system is mounted and visible at a time and all the shared free space is shown as belonging to the mounted file system. In the concurrently visible file system embodiments, the shared free space 1006 is actually divided up into free space for the primary file system 1006A and free space for the secondary file system 1006B. Thus the primary file system data 1002 and free space for the primary file system 1006A would be listed under volume A: and the secondary file system data and the free space for the secondary file system 1006B would be listed under volume B: of FIGS. 8, and 9A-9B. Any of a number of free space allocation techniques may be used, for example always dividing the free space up equally between the two file systems. In another implementation, the bulk of the free space may be allocated to the first of the file systems written to, while always maintaining at least a minimum free space buffer in the other of the file systems not being written to first. In this implementation, the free space allocation difference would persist throughout the use of the dual file systems. The distribution of free space in the concurrently visible file system implementations may scale to more than two file systems in other embodiments.

For example, assuming a 1 Gigabyte capacity NVM system with two file systems (primary and secondary, where the secondary is a secure file system accessible only by authentication) each having 250 Megabytes of data, in a dual visible file system version each file system would be assigned a particular amount of the remaining 500 Megabytes of free space. Assuming that the minimum buffer of free space is 100 Megabytes and that the primary file system is first accessed, the primary system may be allocated by the controller 102 all the free space greater than the 100 Megabyte buffer needed in the second file system, and thus would be allocated 400 megabytes of the 500 megabytes of free. So the primary file system would show 250 megabytes of used space and 400 megabytes of free space and the secondary file system, assuming it was not written to first, would show 250 megabytes of written data and 100 megabytes of free space. This results in the user and the host seeing a total of 1 gigabyte in this 1 gigabyte drive example.

In one implementation, each file system is shown as full size of the device, thus in this example, if the primary file system was being written to, the primary file system (shown as a volume such as volume A:) would be shown as the full logical size of one gigabyte where the secure file system is shown as a single file in volume A: of 350 megabytes (the 250 megabytes of data and the 100 megabytes of allocated free space). Conversely, when the user authenticates to the secondary file system (assuming it is a secure file system) in this version, the 250 gigabytes of actual files and 100 gigabytes of space are shown in conjunction with a 650 gigabyte file that would be volume A. At times when one of the file systems needs more space from the other file system, the NVM system 100 may inform the host 101 to make the change to the file systems to indicate the switch in overall size of that file system. Any of a number of different schemes for permitting the NVM system 100 to initiate changes in the file system to be mounted and then inform the host 101 to accept the changes, are contemplated. For example, the controller 102 of the NVM system 100 may generate log data regarding the changes to be made and then notify the host 101 to integrate these changes into the host's own awareness of the state of the file system at the time the file system is mounted.

Messaging between the NVM system 100 and the host 101 may incorporate small computer system interface (SCSI) commands and protocols to inform one another of changes and request that the host look at the changes to the file system to be mounted, such as NVM system 100 initiated updates to boot parameter block 603 and FAT table 606 updates generally. One example of the type of communication protocols and formats for allowing a NVM system 100 to communicate with a host 101 about a file system change made by the NVM system is illustrated in U.S. Pat. No. 8,886,597, the entirety of which is hereby incorporated by reference herein. Alternatively, the host needs to be aware that it should wait for a command from controller 102 of the NVM system 100 to flush the host command file system cache, wait for the NVM system 100 to update the file system information and then go back to the NVM system 100 to lookup the current file system data. In general, host devices assume that changes to file systems were made by the host and do not look for changes to the file system.

This change to the order of operations, where the file system information may be changed by the NVM system 101 itself and the host 101 must be aware that it needs to look for those changes, is necessary so that memory system and the host can cooperate properly. Although implementation of the concurrently visible file system version of managing two file systems requires changes to both the host 101 and the NVM system 100 to achieve the necessary cooperation, an advantage of seeing both file systems concurrently is that files can be copied from one file system to the other quite easily. As noted previously, the changes that the NVM system 100 may make to a file system may be changes to any part of the file system data structure, such as the boot parameter block, the file allocation tables or directory area, and so on. The FAT file system, such as FAT32 has been generally discussed as the file system herein, however this is just one example file system. Any of a number of other file systems may be utilized instead, such as NTFS or other file systems.

As noted above, a second version of the dual visible file system technique is, instead of showing the inactive file system as a single file as discussed above, the NVM system shows all of the logical block addresses associated within the inactive file system as bad sectors or unavailable. Thus, all the space occupied by data in the other file system would be shown as bad or inaccessible.

Figure 11:
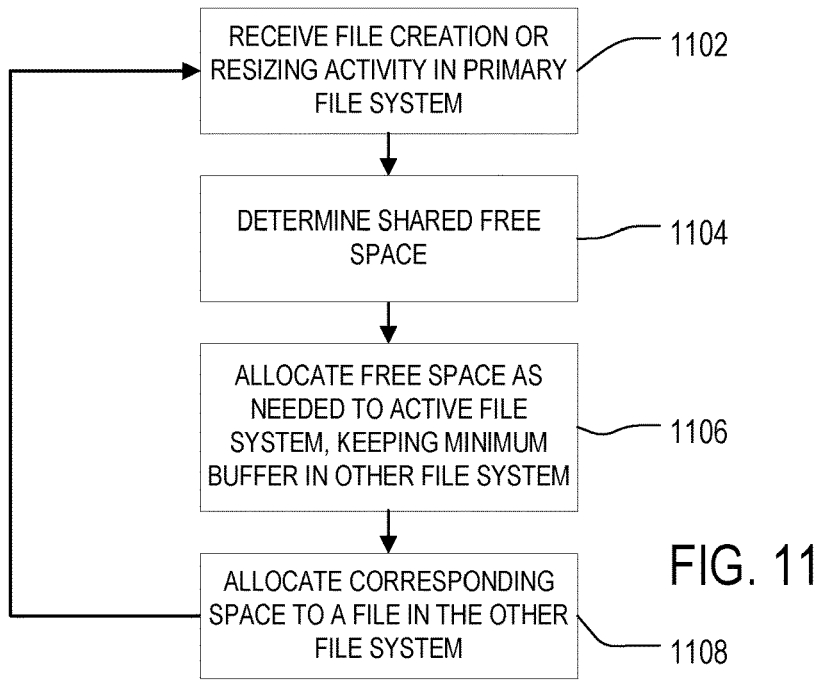
FIG. 11 is a flow chart of one method of dividing free space between file systems when utilizing a concurrently visible file system technique.
Figure 12:
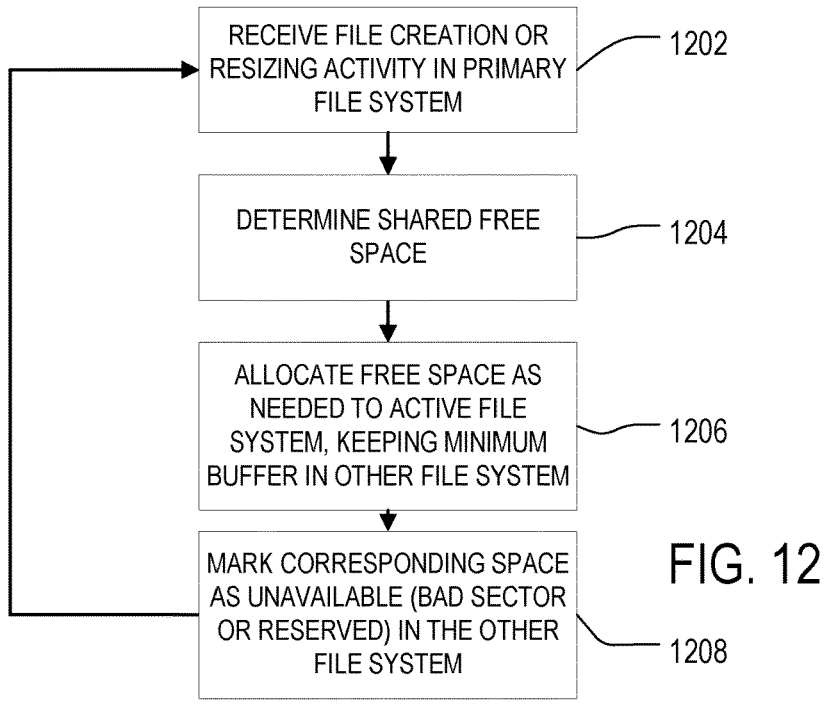
FIG. 12 is a flow chart of one alternative of the method of FIG. 11.

Referring to FIGS. 11 and 12, flow charts are shown illustrating different versions of the two different concurrently visible file system techniques discussed above. With respect to the version of a host (and thus a user) concurrently seeing multiple file systems, where each file system is shown as a separate drive or volume (e.g. via a different drive letter or volume letter) and a placeholder file in the active file system represents all of the free space and file space of the inactive file system, FIG. 11 shows an exemplary process. When the host receives a command from a user or other source that is directed to a particular file system, the host determines if there is a need for creating a new file or resizing an existing file do to writes or deletions (at 1102). The host then determines the amount of shared free space 1006 that exists in the NVM system 1000, where the free space comprises unwritten physical space non-volatile memory (at 1104). The host then allocates any free space to the appropriate file system based on the file creation or resizing activity in that file system, keeping a buffer amount of free space for simultaneous allocations in both file systems (at 1106). The allocation may be a command sent from the host to the NVM system 1000 to update the FAT volume 600 for the active file system (e.g. the FAT 602 or other logical-to-physical mapping tables for the active file system), where the active file system refers to the file system that the user or host is currently manipulating. In response to the allocation of free space in the active file system, the NVM system and/or the host may allocate the corresponding remaining free space associated with the other file system in the placeholder file and the other file system (at 1108).

The placeholder file representing the other file system in the active file system may be locked within the host such that input/output may not be permitted to the placeholder file. When changes are needed in the placeholder file for the active file system and the inactive file system in response to activity in the active file system, the NVM system may instruct the host to wait for changes to the file system data structures, initiate the changes to the inactive file system data structures and transmit a command to the host to look for and recognize the inactive file system changes. Alternatively, the initial command to the host regarding NVM system 100 activity in updating the file system data structures may carry with it a certain delay period that the host 101 will honor and then look for the updated information. In yet another alternative of how the NVM system 100 initiates changes to the file system data structures, the NVM system may instead simply send a command to the host 101 to make changes desired to the file system data structures to reflect the rebalancing of fee space. In this latter alternative, it is still the file system management module 112 and controller 102 of the NVM system initiating changes to the file system, but the host recognizes the command from the NVM system to make the changes requested.

The alternative technique mentioned above of identifying all space allocated to an inactive file system as bad or unavailable is illustrated in FIG. 12. Similar to the technique of FIG. 11, when the host receives a command from a user or other source that is directed to a particular file system in the NVM system 100, the host determines if there is a need for creating a new file or resizing an existing file due to writes or deletions (at 1202). The host 101 then determines the amount of shared free space that exists in the NVM system 100, where the free space comprises unwritten physical space (at 1204). The host then allocates free space to the required file system based on the file creation or resizing activity, keeping a buffer amount of free space for simultaneous allocations in both file systems (at 1206). Unlike the placeholder file version of FIG. 11, however, in the bad sector marking version of FIG. 12 the NVM system and/or the host may mark corresponding remaining space associated with the other file system as unavailable, for example using reserved or bad sector flags (at 1208). Any attempt by the host to access the logical block addresses of the inactive file system while operating in the active file system would thus return errors.

The placeholder file version of the concurrently visible file system alternative may not prevent deletion by the host of the placeholder file representing the data in the unmounted file system, but any attempt to write to the sectors of the unmounted file system will return errors. Achieving the same goal, but through a different mechanism, the version of concurrently visible file systems where the unmounted file system is artificially assigned bad block (sector) status will prevent the host 101 from even attempting to write to those LBAs. Thus, in either implementation of the concurrently visible file system technique, the NVM system 100 may prevent the host from overwriting, erasing or inadvertently formatting of the file system not currently being viewed.

Figure 13:
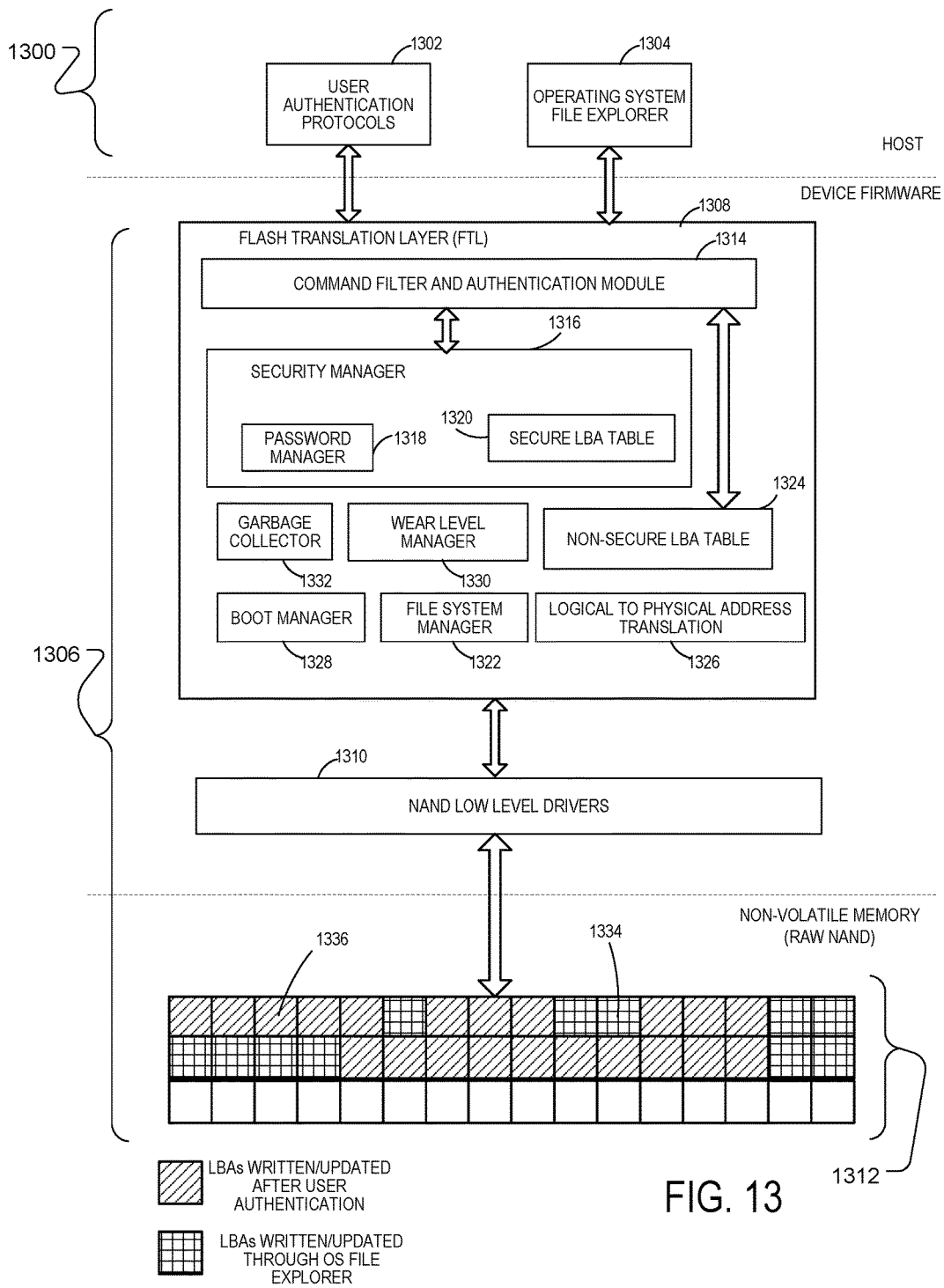
FIG. 13 is a functional block diagram of the host and non-volatile memory system of FIGS. 2A-2B.

Referring to FIG. 13, a functional diagram of the system of FIGS. 2A-2B having two (secure and non-secure) file systems is shown. In FIG. 13, a host 1300 is shown with a standard user authentication protocol module 1302 for authenticating to a secure file system on a non-volatile memory system, and a standard host operating system file explorer 1304, such as a WINDOWS or LINUX file explorer. The non-volatile memory system 1306 that is in communication with the host 1300 includes a flash translation layer (FTL) 1308 and NAND lo level drivers 1310 for communicating between the host and the non-volatile memory cells 1312 in the non-volatile memory system 1306. The FTL 1308 includes a command filter and authentication module 1314 that is configured to check signatures or authentication on data to determine whether a host data packet belongs to a particular file system, for example data intended for secure storage in a secure file system or data intended for storage in a default or non-secure file system.

When data originating from a secure application on the host 1300 is communicated to the non-volatile memory system 1306 via the standard user authentication protocols 1302 (such as IEEE-1667 noted previously), the command filter and authentication module will route the data to the security manager 1316 in the FTL 1308. The security manager 1316 may contain a password manager 1318 used by the secure file system to approve authentication of the host 1300 via the authentication protocol module 1302. The password manager may store user passwords in a secure area during the creation of a secure file system. These stored passwords may then be validated against user-entered passwords during authentication. A secure logical block address (LBA) table 1320 may be maintained in the security manager 1316 storing the logical to physical address mappings of the data in the secure file system.

When data originating from a standard, non-secure application, via the operating system 1304 on the host 1300 arrives at the command filter and authentication module, it is routed to the non-secure LBA table 1324 for appropriate addressing in the non-secure file system. The secure and non-secure LBA tables 1320, 1324 may use the same LBA numbers, but each LBA number in each table is associated with a different physical address in the non-volatile memory 1312. Thus, LBA15 in the secure file system that utilizes the secure LBA table would be associated with a different physical address than LBA 15 of the non-secure file system that utilizes the non-secure LBA table. In one implementation, the non-volatile memory system 1306 does not contain any logical partition tables. The non-secure file system or partition and the secure file system or partition (created through a secure host application) do not have any fixed size. Their sizes may increase or decrease automatically as the data is added or deleted. Each file system (partition) may have independent addressable space starting from logical address 0x00000000(LBA 0x0).

A file system manager 1322 operates to mount or unmounts the appropriate file system (in the single visible file system technique of static file resizing described previously) based on the data being received and the outcome of any necessary authentication, or manages the file system data updates in cooperation with the host 1300 (as with the concurrently visible file system techniques described previously) activity in the different file systems supported by the non-volatile memory system 1306. Other memory management functions in the FTL 1308, may include garbage collection and wear levelling modules 1332, 1330, as well as a boot manager 1328 for managing the appropriate boot block access and update for the appropriate file system.

Data that is received, whether for the secure or non-secure file system, receives its physical address information from the appropriate one of the LBA tables 1320, 1324 and that address may then be used by the NAND low-level drivers 1310 to direct the data to or from the appropriate physical address in the non-volatile memory 1312. The non-volatile memory 1312 shown in FIG. 13 assumes a two file system (secure and non-secure) arrangement and shows LBAs 1334 written or updated by a secure application via the authentication protocols 1302 mixed with LBAs 1336 written to or updated through a non-secure host application via an operating system, such as a WINDOWS/Linux operating system in different respective physical address locations.

Figure 14:
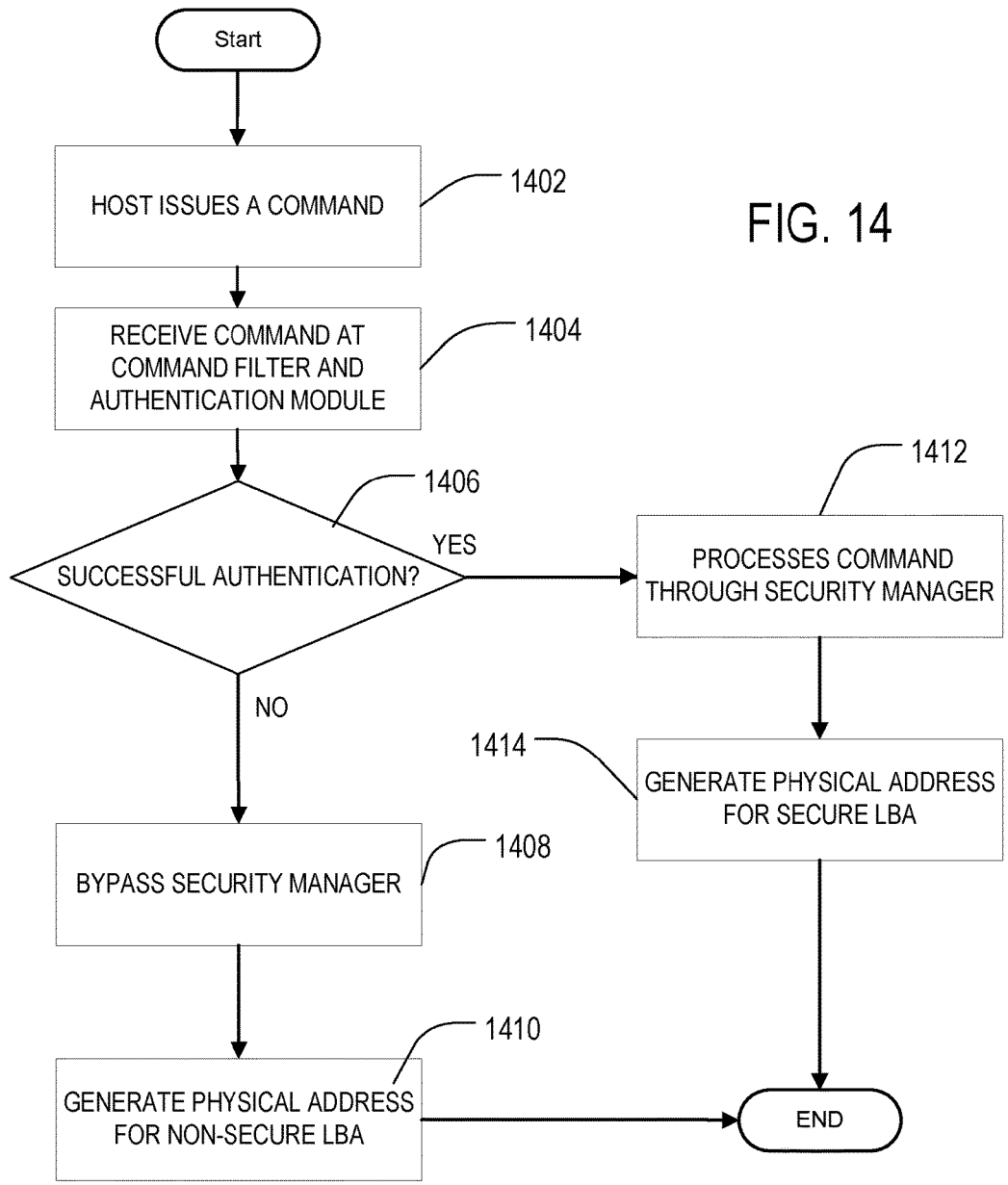
FIG. 14 is a flow diagram of a method of routing data to a multiple file system in a non-volatile memory system.

FIG. 14 illustrates one method of the file system manager 922 and other modules of the non-volatile memory system 1306 of FIG. 13 handling data routing. The process starts when a host command is issued (at 1402) and the command is first received at the command filter and authentication module 1314 of the NVM system 1306 (at 1404). The command filter and authentication module 1314 determines if there has been a successful authentication to a secure file system (at 1406), for example based on a comparison of the password information received from a user at the host with what is stored in the password manager 1318. When successful authentication is not detected, the file system manager 1322 directs the command/data to the non-secure LBA table 1324 and logical to physical address translation module 1326 for handling (at 1408, 1410). When the host command is associated with a successful authentication, the security manager 1316 accesses the secure LBA table 1320 and works in cooperation with the logical to physical address translation module 1326 to store data in LBAs and physical addresses associated with the secure file system (at 1412, 1414).

Figure 15:
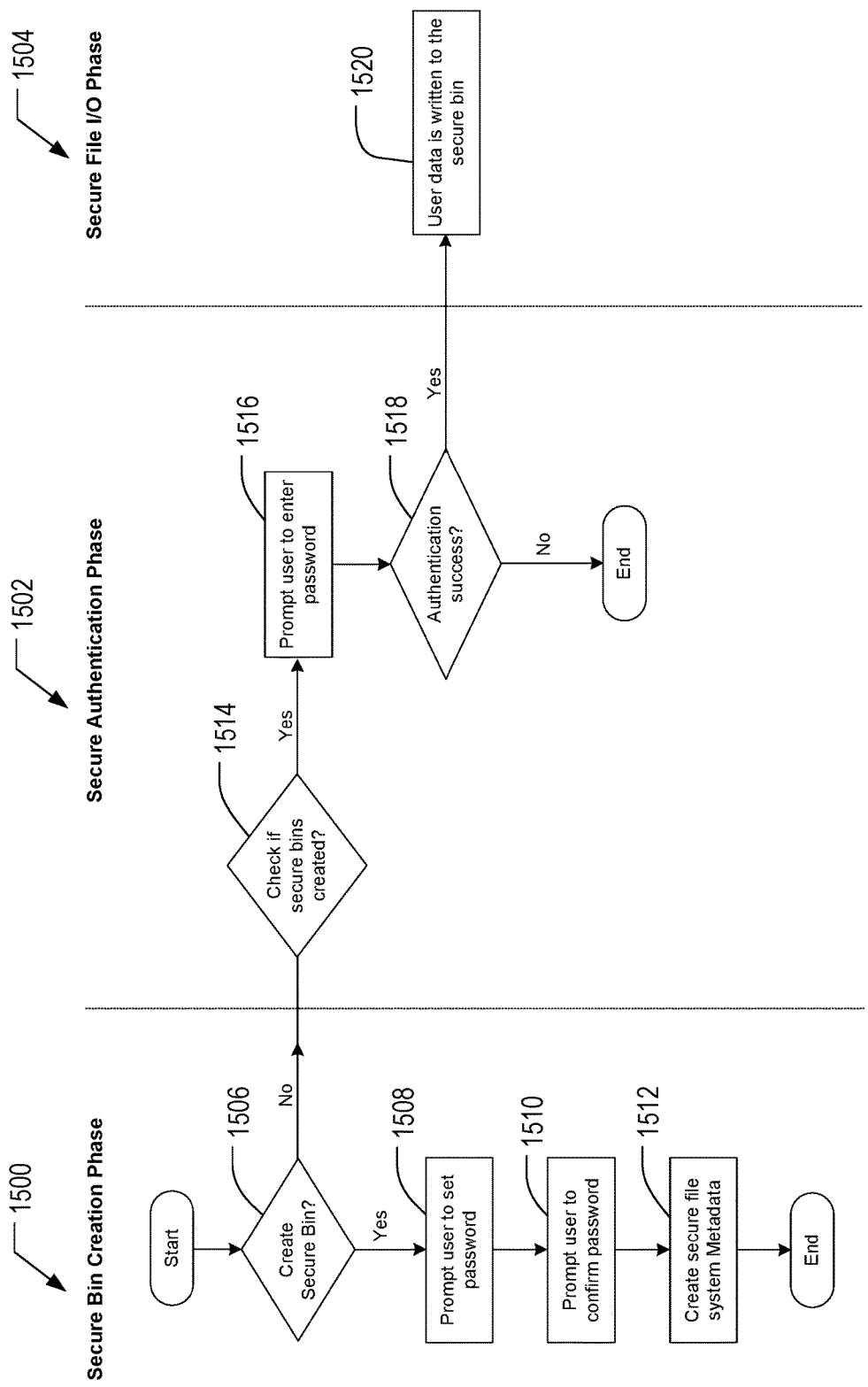
FIG. 15 is a flow diagram of secure file system creation, authentication and I/O phases in a non-volatile memory system.

Example use cases of how a NVM system and a host, configured to operate with and create multiple FAT file systems such as discussed above, are now discussed. Referring to FIG. 15, the different phases of creating a secure file system on a NVM system, authenticating to that secure file system and writing or reading data from that file system is illustrated. The secure application on the host and the file system management module 112 on the NVM system may work together to define three basic phases of operation for secure file system usage: the secure file system creation phase 1500, the secure authentication phase 1502 and the secure file input/output (I/O) phase 1504.

The secure file system creation phase 1500 starts when a user on a host decides to create a secure "bin" to securely store data. The term bin is used here to designate a portion of the non-volatile memory in a NVM system that is only accessible via a particular file system. A secure bin is a bin that operates with a secure file system that requires user authentication, for example a user identifier and/or password to access the data that is stored with the secure file system. A non-secure bin requires no additional authentication and operates with a non-secure file system.

In one implementation, a secure application on the host, in cooperation with the file system management module 112, includes a secure bin creation phase 1500 that allows the NVM system to determine if a user is requesting creation of a new secure bin (at 1506) and, if the NVM systems determines that a new secure bin is desired, then the secure application on the host in cooperation with the password manager and authentication module on the NVM system may prompt the user to set a password for the secure bin (at 1508), prompt the user to confirm the password (at 1510) and create the secure file system metadata for the secure bin (at 1512). The prompting for the password and password confirmation may simply be the presenting on a user interface for the host of a password input line and a second input line for retyping the password so that the host and NVM system can make sure the password entries match. Creation of the secure file system metadata may be the generation on the NVM system of the FAT or other file system data structures to handle the separate file handling within the newly created secure bin. The initial FAT data structures created may be the FAT table(s) and directory structures necessary for handling a default amount of the non-volatile memory, or may be sized based on the initial amount of file data that will be stored in the new secure bin.

If a command from the host is directed to accessing an existing secure bin rather than creating a new bin, the secure host application and NVM system cooperate to verify that there are one or more secure bins already in existence (at 1514) and the secure application prompts the user to enter the appropriate password for the secure file system of that secure bin. If the authentication process is successful (the password or other authentication mechanism is correct) (at 1518), then the NVM system moves to the secure file I/O phase (at 1504). In this phase of operation, the NVM system will permit the host to write user data to, or access user data from, the secure bin (at 1520) using the file system data for the particular secure bin the user has authenticated to.

Figure 16A:
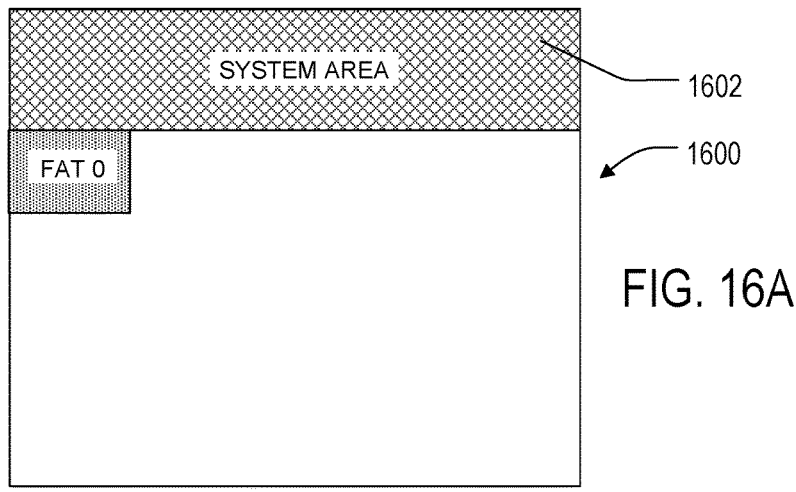
FIGS. 16A-16E illustrate different states of a non-volatile memory system having multiple file systems.
Figure 16B:
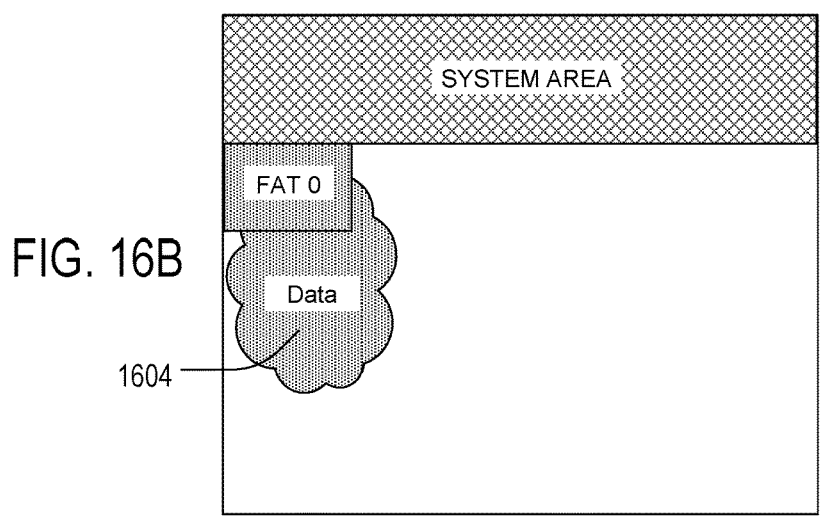
Figure 16C:
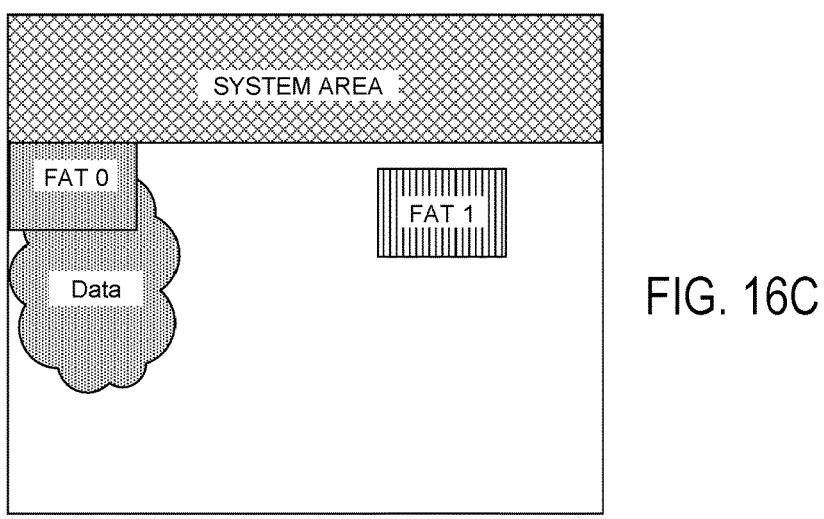

FIGS. 16A-16E conceptually represent different states of the non-volatile memory in the NVM system achievable with the file system management module 112 and controller. FIG. 16A represents an example freshly formatted non-volatile memory 1600 of a NVM system, such as a memory card that has had no user data written to it. The non-volatile memory includes a FAT table, FAT 0, and file system attributes that have been created for a public (non-secure) partition. Thus, before creating any secure bins, the entire non-volatile memory 1600 is a public partition (also referred to as a non-secure bin). The capacity of public partition is equal to card capacity because there is only one file system present in the NVM system. Data and file system attributes of this public partition can be accessed by secure applications as well as standard operating system file explorers (e.g. WINDOWS or LINUX file explorers). The system area of the nonvolatile memory can be used to store device specific information, passwords, file system attributes and so on. FIG. 16B conceptually illustrates how non-secure data 1604 is added to the NVM system and is associated with the public partition and its file system (FAT 0). FIG. 16C represents the non-volatile memory 1600 at a later stage during secure bin creation (such as secure creation phase 1500 in FIG. 15). The secure application on the host creates the FAT table, FAT 1, for the secure bin and stores the other file system attributes and passwords necessary to support this new FAT volume in the system area 1602.

Figure 16D:
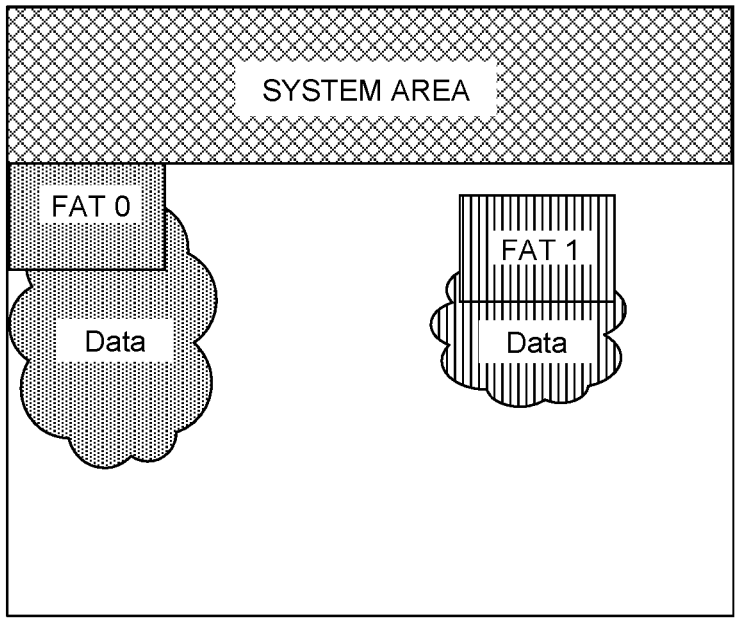
Figure 16E:
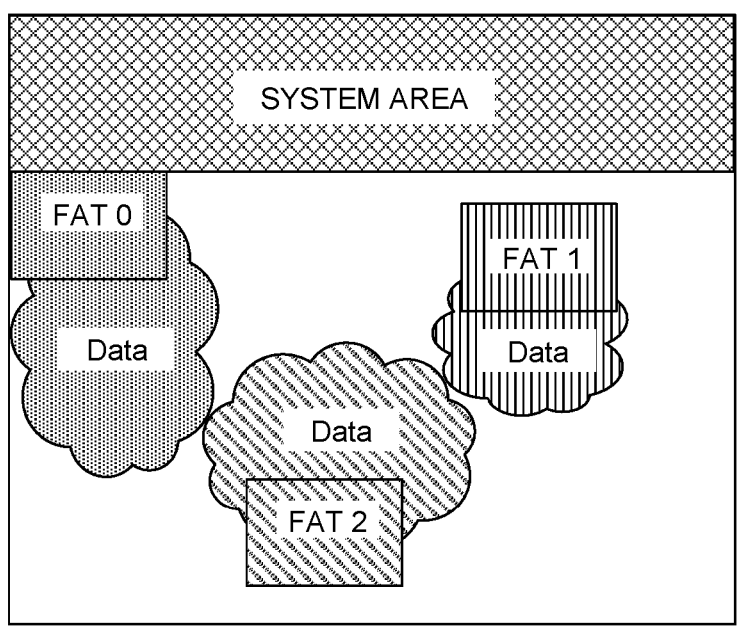

After successful authentication (for example using the secure authentication phase 1502 of FIG. 15), a secure host application on the host may then store data in the secure bin as represented in FIG. 16D. The secure data would be associated with the file system mapped by FAT 1 as represented in FIG. 16D. As described above with respect to the discussion in FIGS. 5-12 of a single visible file systems or concurrently visible file systems in a NVM system, the public partition (non-secure bin of data associated with the file system of FAT 0) and the secure bin (data associated with file system of FAT 1) do not have a fixed size and are adaptable in response available free space and host demands for data storage. The sizes of the file systems increase or decrease automatically based on action of the NVM system as data is added or deleted by the host. Each secure bin or public partition has independently addressable space starting from logical address 0x00000000(LBA 0x0) and the file systems for FAT0 and FAT1 may be independently mounted with only the mounted file system visible, or concurrently visible, as described above. As is represented by FIG. 16E, the non-volatile memory 1600 may include any number of different secure bins, here a second secure bin of FAT 2 and its associate data is shown, and the number of bins and size of the bins is only limited by the capacity of the NVM system.

Figures 17C, 17D:
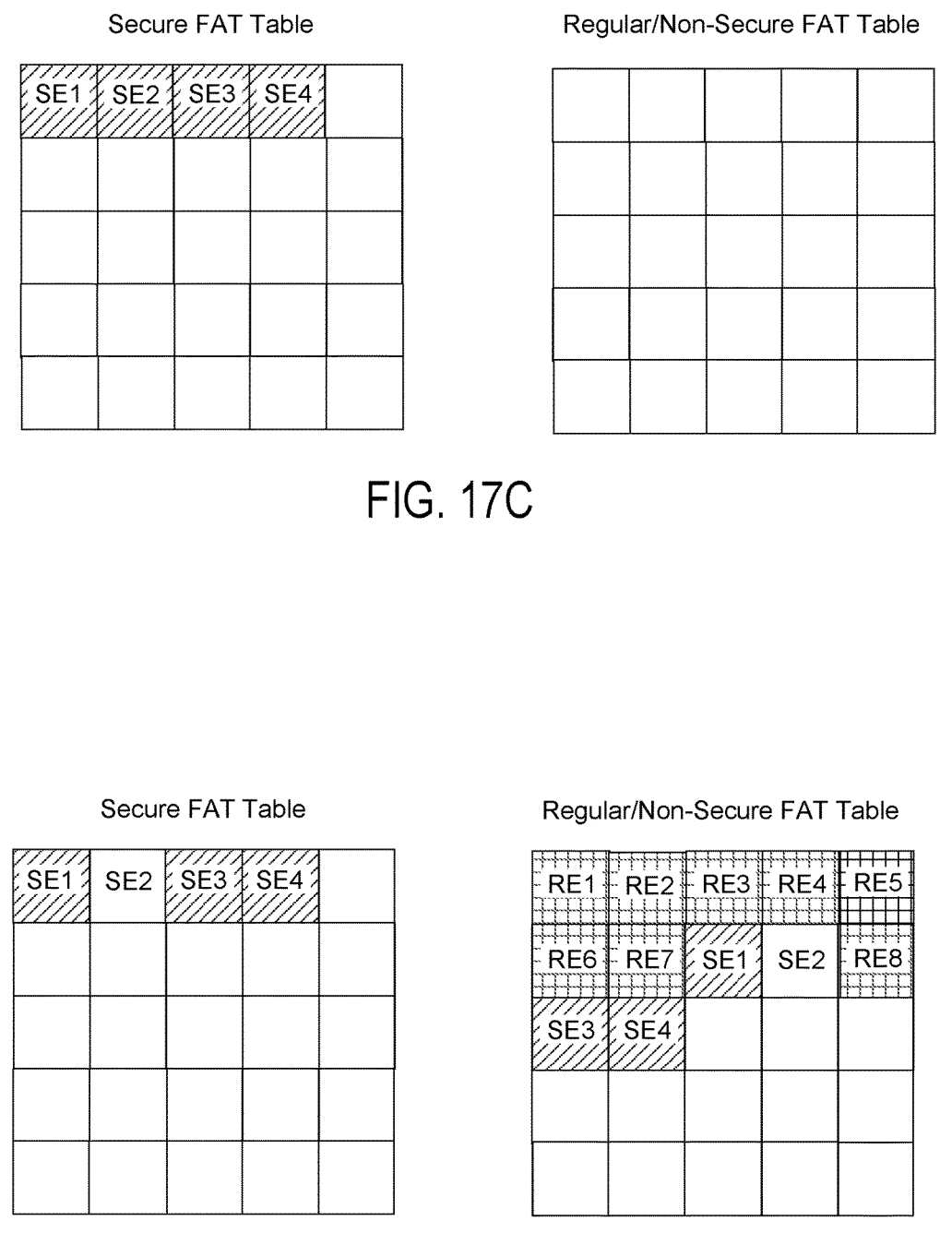

Referring to FIGS. 17A-17D, an alternative example is shown of how a non-secure FAT file system (e.g. FAT 0 of FIGS. 16A-16D) and a secure FAT file system (e.g. FAT 1 of FIGS. 16C-16D) may interact and be updated is shown for write, read, format and erase operations. FIG. 17A shows how the secure FAT table of FAT 1 and the non-secure FAT table of FAT 0 may look immediately after the secure application on the host finishes the secure bin creation phase (FIG. 15, 1500) and generates the file system metadata (here the secure FAT) and prior to writing any data associated with the secure FAT. The non-secure FAT is shown with entries for regular data (RE1-RE7) that already exist in the non-secure partition of the NVM system in this example.

FIG. 17B illustrates the tables of FIG. 17A at a hypothetical later time when additional regular data (RE8) and secure data (SE1-SE4) have been written by the controller to the respective FAT tables. Secure data entries SE1, SE2, SE3 & SE4 are the FAT entries updated by the secure application on the host via the security manager 1316 (FIG. 13). Whenever data is written through secure application, entries in the secure/non-secure FAT tables are also updated. This synchronization of tables not only helps the operating system file explorer (such as in WINDOWS or LINUX) in determining free space of the device but also in retaining the user data even when secure bin on the device is uninstalled (unmounted).

As illustrated in FIG. 17C, assuming that a user decides to format the NVM system while in the non-secure file system (associated with the non-secure FAT), and not while the secure file system is mounted or authenticated to, only the non-secure FAT table contents are erased and the secure contents can still be retrieved using the secure application on the host. Conversely, if the user was authenticated to the secure file system and the secure file system mounted, then, if the user wanted to format the NVM system from the secure file system perspective, only the secure FAT system table contents would be erased and the non-secure contents would still be retrievable through the non-secure file system.

FIG. 17D shows the example secure and non-secure FAT tables after deletion of a secure entry, in this example entry SE2. In order to delete entry SE2, the user would need to be authenticated into the secure file system and the secure file system mounted. When the secure data associated with SE2 is deleted, the secure FAT entry SE2 is deleted from the secure FAT and from the non-secure FAT.

The system and method described above reveals a way of managing multiple file systems on a single non-volatile memory system. The method and system may provide a way of allowing the memory system alone, rather than the host, to modify file systems so that the host believes it is looking at separate devices and only sees one file system at a time. Alternatively, a system and method of concurrently displaying multiple file systems, and dynamically updating the file system data as free space is taken up by one or the other file system, is shown. The non-volatile memory system may change the size of a file system dynamically. The management of multiple file systems shown concurrently to a host is achievable with cooperation between the host and the non-volatile memory system.

In the present application, semiconductor memory devices such as those described in the present application may include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three-dimensional memory structure.

In a two-dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements is formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional exemplary structures described but cover all relevant memory structures within the spirit and scope of the invention as described herein and as understood by one of skill in the art.

A system and method for handling multiple file systems on a single storage system has been disclosed. In different embodiments, the different file systems may share the same pool of free blocks and be mounted separately so that a host is only aware of a single file system at a time. The storage system may update a file system just before it is mounted, for example to account for use or reallocation of the shared free space by prior mounted file systems, without the host file system needing any knowledge of the multiple file systems. In another embodiment, multiple file systems may be visible to the host at one time and updates may be made to one file system by the host and storage in cooperation with one another. Formatting or deletion of one file system may not affect or erase file system or user data associated with other file systems.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A non-volatile memory system configured for communication with a host, the non-volatile memory system comprising:
a non-volatile memory having a maximum storage capacity, the non-volatile memory containing:
a first file system associated with data occupying a first portion of the maximum storage capacity;
a second file system associated with data occupying a second portion of the maximum storage capacity, the first portion being different than the second portion; and
a free space portion, the free space portion comprising available capacity remaining in the non-volatile memory other than the first portion and the second portion; and
a controller in communication with the non-volatile memory, the controller configured to:
in response to receipt of a file system mounting trigger for mounting the second file system:
determine a current capacity associated with the free space portion;
unmount the first file system; and
mount the second file system, wherein to mount the second file system the controller is further configured to, independently of the host, update the second file system to present a total capacity of the second file system to the host as equal to a sum of the current capacity of the free space portion and an amount of the maximum storage capacity currently occupied by data associated with the second file system while hiding the first file system from the host.

2. The non-volatile memory system of claim 1, wherein the first file system comprises a default file system.

3. The non-volatile memory system of claim 2, wherein the second file system comprises a secure file system only visible to the host upon authentication of a user via a secure application on the host.

4. The non-volatile memory system of claim 1, further comprising a first file system mapping table and a second file system mapping table, each of the first file system mapping table and the second file system mapping table having a set of logical addresses mapped to physical addresses, wherein each of the physical addresses in the first mapping table differ from each of the physical addresses in the second mapping table.

5. The non-volatile memory system of claim 4, wherein the controller is configured to determine the current capacity associated with the free space portion by subtracting a number of physical addresses mapped in each of the first and second mapping tables from a total number of physical addresses associated with the maximum capacity of the non-volatile memory.

6. The non-volatile memory system of claim 1, wherein the controller is configured to unmount the first file system by switching a boot block sector of the first file system with a boot block sector of the second file system.

7. The non-volatile memory system of claim 1, wherein to mount the second file system the controller is configured to:
identify a logical to physical mapping table for the second file system;
update a file system address range for the determined file system; and
populate a boot code address with a pointer to the file system address range.

8. The non-volatile memory system of claim 1, wherein the non-volatile memory comprises a substrate formed with a three-dimensional memory structure.

9. A method for managing multiple file systems on a non-volatile memory system, wherein the non-volatile memory system comprises non-volatile memory, a plurality of file systems each associated with a respective portion of the non-volatile memory, and a controller in communication with the non-volatile memory, the method comprising the controller:

receiving a file system mounting trigger;

selecting one of the plurality of file systems based on the mounting trigger;

determining a current amount of free space in the non-volatile memory;

adjusting a size of a logical address range of the selected one of the plurality of file systems to include logical addresses for the current amount of free space in the non-volatile memory and logical addresses already associated with data managed by the selected one of the plurality of file systems; and presenting to a host the selected one of the plurality of file systems as having the adjusted size of the logical address range.

10. The method of claim 9, wherein presenting to the host comprises the controller of the non-volatile memory system:

permitting the host to access only a file system data structure regarding the selected one of the plurality of file systems; and preventing the host from seeing any information regarding any other of the plurality of file systems while the selected one of the plurality of file systems is mounted.

11. The method of claim 10, wherein presenting to the host comprises representing to the host that a total capacity of the non-volatile memory system is only an amount of capacity addressable by the adjusted size of the logical address range.

12. The method of claim 9, wherein determining the current amount of free space comprises the controller of the non-volatile memory subtracting an amount of capacity mapped to each of the plurality of file systems from a total capacity of the non-volatile memory system.

13. The method of claim 9, wherein:

receiving a file system mounting trigger comprises receiving an initial power on reset signal; and selecting one of the plurality of file systems comprises the controller of the non-volatile memory system selecting a predetermined default file system from the plurality of file systems in the non-volatile memory system.

14. The method of claim 9, wherein receiving the file system mounting trigger comprises receiving a host command to access a different one of the plurality of file systems than is currently accessible to the host, the host command comprising a file system identifier and authentication information for the different one of the plurality of file systems.

15. The method of claim 12, wherein adjusting the size of the logical address range comprises the controller of the non-volatile memory updating a boot parameter block in the non-volatile memory to include a mapping table for the selected one for the plurality of file systems having the adjusted size logical address range.

16. The method of claim 15, wherein presenting to the host comprises the controller of the non-volatile memory system changing a boot sector to point to the updated boot parameter block for the selected one of the plurality of file systems.

17. A method for managing both a first file system and a second file system on a non-volatile memory system, wherein the non-volatile memory system comprises non-volatile memory, each of the first and second file systems associated with respective files occupying a respective portion of the non-volatile memory, and a controller in communication with the non-volatile memory, the method comprising the controller:

allocating a first portion of free space available in the non-volatile memory to the first file system;

allocating a second portion of free space available in the non-volatile memory to the second file system; and updating the first file system to identify the second file system as a single file occupying an amount of physical capacity of the non-volatile memory system equal to a capacity of the respective files associated with the second file system and the second portion of free space available in the non-volatile memory.

18. The method of claim 17, wherein the controller updates the first file system to indicate that the single file is a file of reserved space in the non-volatile memory system.

19. The method of claim 17, wherein the controller updates the first file system to indicate that the single file is a file of bad sectors in the non-volatile memory system.

20. A non-volatile memory system configured for communication with a host, the non-volatile memory system comprising:

a non-volatile memory having a maximum storage capacity, the non-volatile memory containing:

a first file system associated with data occupying a first portion of the maximum storage capacity;

a second file system associated with data occupying a second portion of the maximum storage capacity, the first portion being different than the second portion; and a free space portion, the free space portion comprising available capacity remaining in the non-volatile memory other than the first portion and the second portion; and means, responsive to receipt of a file system mounting trigger for mounting the second file system, for:

determining a current capacity associated with the free space portion, unmounting the first file system, and updating, independently of the host, the second file system to present a total capacity of the second file system to the host as a sum of the current capacity of the free space portion and an amount of the maximum storage capacity currently occupied by data associated with the second file system, while hiding the first file system from the host.

* * * * *